United States Patent
Adderly et al.

(10) Patent No.: US 9,699,832 B2
(45) Date of Patent: *Jul. 4, 2017

(54) DISTRIBUTED CELLULAR CLIENT NETWORK

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,308

(22) Filed: Mar. 7, 2016

(65) Prior Publication Data

US 2016/0374131 A1    Dec. 22, 2016

Related U.S. Application Data

(63) Continuation of application No. 14/742,845, filed on Jun. 18, 2015.

(51) Int. Cl.
| | |
|---|---|
| *H04B 7/15* | (2006.01) |
| *H04B 7/185* | (2006.01) |
| *H04M 3/00* | (2006.01) |
| *H04B 7/00* | (2006.01) |
| *H04W 88/04* | (2009.01) |
| *H04W 12/06* | (2009.01) |
| *H04W 4/00* | (2009.01) |

(Continued)

(52) U.S. Cl.
CPC ............ *H04W 88/04* (2013.01); *H04W 4/008* (2013.01); *H04W 12/06* (2013.01); *H04W 76/023* (2013.01); *H04W 84/042* (2013.01)

(58) Field of Classification Search
CPC .................................................. H04W 76/023
USPC ................................. 455/11.1, 517, 518, 519
See application file for complete search history.

(56) References Cited

U.S. PATENT DOCUMENTS

| | | |
|---|---|---|
| 6,072,784 A | 6/2000 | Agrawal et al. |
| 7,567,822 B2 | 7/2009 | Hart et al. |

(Continued)

FOREIGN PATENT DOCUMENTS

KR    101394966 B1    5/2014

OTHER PUBLICATIONS

Anonymous, "Cellular Antenna Powers Off When Connected Via Wi-Fi," 3 pgs., IP.com No. 000211855 IP.com Electronic Publication: Oct. 21, 2011.

(Continued)

*Primary Examiner* — Tilahun B Gesesse
(74) *Attorney, Agent, or Firm* — Nolan M. Lawrence

(57) ABSTRACT

A second cellular client delegates cellular communication to a first cellular client. The first cellular client determines that the first cellular client has been assigned to perform cellular communication for the second cellular client. The first cellular client receives a transmission from a cellular service-provider antenna intended for the second cellular client. The first cellular client sends a first command based on the transmission to the second cellular client. The first command instructs the second cellular client to enable the cellular functionality of the second cellular client.

6 Claims, 3 Drawing Sheets

(51) Int. Cl.
*H04W 76/02* (2009.01)
*H04W 84/04* (2009.01)

(56) References Cited

U.S. PATENT DOCUMENTS

| | | |
|---|---|---|
| 7,606,570 B2 | 10/2009 | Karaoguz et al. |
| 7,801,058 B2 | 9/2010 | Wang |
| 7,822,023 B2 | 10/2010 | Lahetkangas et al. |
| 8,051,057 B2 | 11/2011 | Abu-Hakima et al. |
| 8,165,077 B2 | 4/2012 | Reddy |
| 8,326,338 B1 | 12/2012 | Vasilevsky |
| 8,385,976 B2 | 2/2013 | Middleton |
| 8,619,730 B2 * | 12/2013 | Quigley .............. H04W 40/246 370/328 |
| 8,805,978 B1 | 8/2014 | Anthonisamy et al. |
| 8,935,326 B2 | 1/2015 | Tagg |
| 8,942,623 B2 | 1/2015 | Hillan |
| 8,958,784 B2 | 2/2015 | Chin et al. |
| 9,072,052 B2 | 6/2015 | Griffin et al. |
| 2004/0008663 A1 | 1/2004 | Srikrishna et al. |
| 2009/0197585 A1 * | 8/2009 | Aaron ................. H04M 3/2227 455/418 |
| 2013/0279478 A1 * | 10/2013 | De Bruin .......... H04W 36/0083 370/331 |
| 2014/0089508 A1 | 3/2014 | Hawver et al. |
| 2014/0273963 A1 | 9/2014 | Su et al. |
| 2015/0052260 A1 | 2/2015 | Bott |
| 2016/0157168 A1 | 6/2016 | Xue et al. |

OTHER PUBLICATIONS

Anonymous, "Mobile Device Resource Conservation during Geo-Location Operations," IPCOM000231493D, IP.com No. 000231493, 18 pgs., Oct. 2, 2013.

Luqman et al., "Overseer: A Mobile Context-Aware Collaboration and Task Management System for Disaster Response," International Conference on Creating Connecting and Collaborating through Computing (C5), 2010 Eighth, 76-82, 10 pgs., IEEE.

Adderly et al., "Distributed Cellular Client Network", U.S. Appl. No. 14/742,845, filed Jun. 18, 2015.

Adderly et al., "Distributed Cellular Client Tracking," U.S. Appl. No. 14/142,872, filed Jun. 18, 2015.

Adderly et al., "Distributed Cellular Client Tracking," U.S. Appl. No. 15/062,327, filed Mar. 7, 2016.

List of IBM Patents or Patent Applications Treated as Related, Mar. 1, 2016, 2 pages.

\* cited by examiner

DISTRIBUTED CELLULAR CLIENT NETWORK

BACKGROUND

The present disclosure relates to distributing cellular signals, and more specifically, to distributing cellular signals for cellular availability.

Cellular clients may use cellular networks to make telephone calls with other phones. Cellular clients may also use cellular networks to receive media, such as music and movies. Cellular clients may also use cellular networks to transmit media, such as pictures and videos. Cellular clients may include or be incorporated into cellular phones, computing devices, and automobiles.

SUMMARY

Disclosed herein are embodiments of a method and computer program product for delegating cellular communication. A first cellular client determines that the first cellular client has been assigned to perform cellular communication for a second cellular client. The first cellular client receives a transmission from a cellular service-provider antenna intended for the second cellular client. The first cellular client sends a first command based on the transmission to the second cellular client. The first command instructs the second cellular client to enable the cellular functionality of the second cellular client.

Also disclosed herein are embodiments of a system for delegating cellular communication. A processor located within a first cellular client, and in communication with a memory that is also located within the first cellular client, determines that the first cellular client has been assigned to perform cellular communication for a second cellular client. The first cellular client receives a transmission from a cellular service-provider antenna intended for the second cellular client. The first cellular client sends a first command based on the transmission to the second cellular client. The first command instructs the second cellular client to enable the cellular functionality of the second cellular client.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
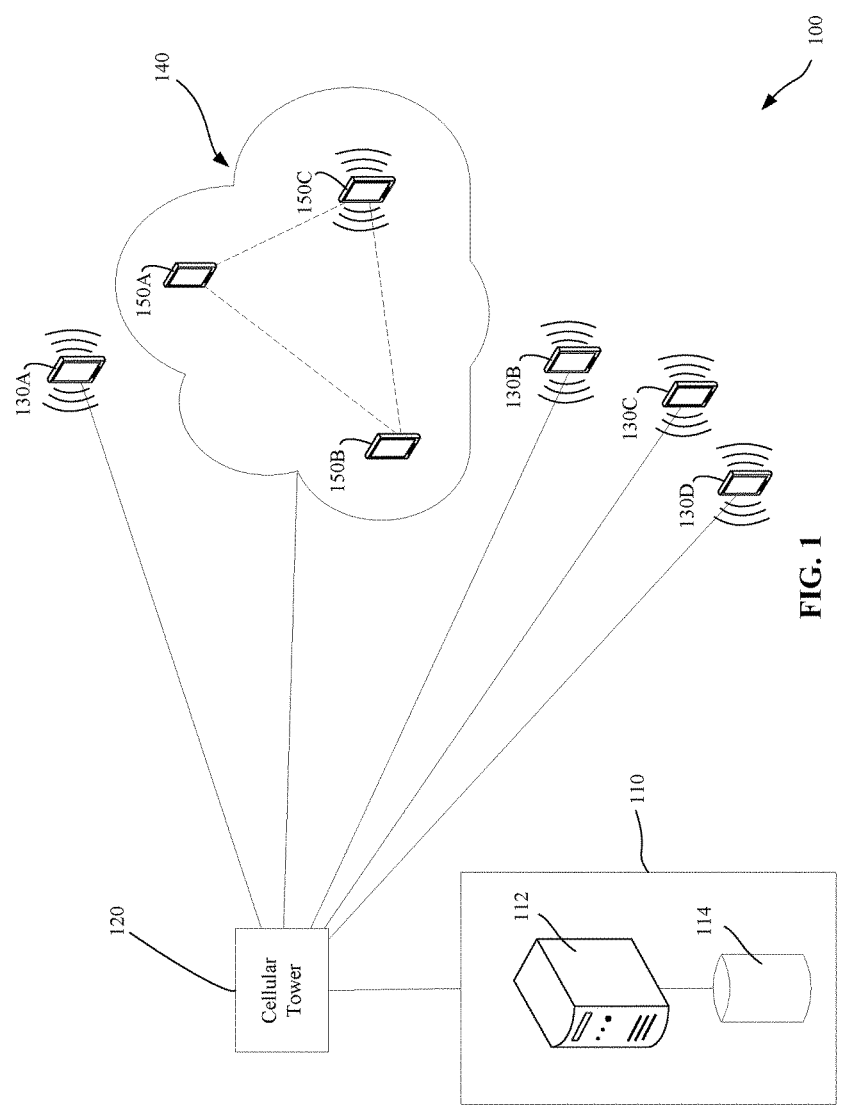
FIG. 1 depicts an example cellular network that may include cellular delegations consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to distributing cellular signals, more particular aspects relate to distributing cellular signals for cellular availability. While the present disclosure is not necessarily limited to such applications, various aspects of the disclosure may be appreciated through a discussion of various examples using this context.

Cellular networks (cell networks) may provide users with network connectivity across vast geographic areas. In detail, cell networks may comprise a plurality of antennas (alternatively, base stations). Each antenna of the plurality may provide connectivity to a separate geographic area (cell) of the cell network. The cell networks may connect to a packet-based network (e.g. the internet). The cell networks may also connect to the public telephone system through telephone switches. Some of the cells may be a quarter or a half of a mile in diameter. Some of the cells may be larger, such as five to twenty five miles in diameter. Each of the cells may project messages to multiple clients through radio waves. Each of the cells may also receive responses from multiple clients through radio waves. Each cell may overlap with adjacent cells, thereby providing contiguous coverage for cellular clients. The overlap may be slight to prevent wasted power being used by each of the base stations. In some embodiments, each cell may operate on a slightly different rage of frequencies from adjacent cells to minimize inference. In some embodiments, each cell may operate based on a radio link protocol to ensure data integrity.

Cellular clients may utilize the cellular networks to enable users to connect with each other. For example, a cellular phone (cellphone) may utilize a cell network to send and receive data by a transceiver (radio) physically coupled to the cellphone. To connect with the cell network, the cellphone may need to constantly provide power to the radio. As a user travels through a first area serviced by a first cell, the cellphone may communication with a first base station. This communication may inform the cell network that the cellphone is located within the first cell. Additionally the cellphone may continually receive echo requests (pings) from the first base station. The cellphone may transmit echo responses (pongs) in response to the echo requests. The cell network may utilize this information to determine that the cellphone is available and able to receive voice or data from the first base station, such as a telephone call or a text message, respectively.

If the user moves outside of the first cell, the cellular network may determine that the cellphone has traveled to a second cell. The cell network may determine the movement of the cellphone based upon the pings and pongs to and from the cellphone. The cell network may instruct a second base station, located within the second cell, to locate (through a second set of pings and pongs) and provide service to the cellphone. To maintain availability, the cellphone may continually provide power to its radio. In some embodiments, to maintain availability to the cell network the cellphone may also continually power other cellular functionalities (e.g., cellular processors, other electronics related to cellular functions, software algorithms related to cellular functions, etc.).

The continual power draw of the cellular functionality may reduce the usability of cellphones. Cellphones may use a significant percentage of battery to power the cellular functionality. With the advent of the internet and the smartphone, cellphones have become indispensable devices used all day and everywhere (e.g., communicating with others, consuming media, playing games, payment methodologies, shopping, etc.). This ubiquity has led to various efforts to alleviate the battery issues surrounding cellular connectivity. Battery technology may increase every year, but cell phones may increase in usage and power consumption at a rate that is greater than the increase in battery longevity. To alleviate congestion, some cellphones utilize secondary networks to maintain network availability, such as using a wireless access point connected to the internet. Unfortunately, this type of wireless internet fallback may only be useful when a cellphone is within the limited range of such a network. Users may be able to extend battery life by disabling cellular functionality (e.g., by using an airplane mode). This may, however, eliminate much of the usefulness of the cellphone because a user may not be able to receive phone calls from others while the cellular functionality is disabled.

Battery usage issues may be solved by phone manufacturers creating larger cellphones. But any increase in size of a cellphone may be offset by larger screens that consume any additional power output. Some phone cases may contain additional batteries that improve battery life, but are often unwieldy to travel with because they increase the heft of the cellphone. Detachable phone accessories may include external batteries providing additional power to cellphones. However, detachable batteries may increase complexity and may be easily lost or misplaced. In addition, wearable computing devices (e.g., smart watches) may also provide cellular functionality. Unfortunately, wearable computing devices may be unable to include larger batteries because of ergonomic or aesthetic reasons. In cases of adjusting the size of the battery the underlying problem of usage rate of the battery may not be alleviated but only masked. Inherent problems, such as power consumption and recharge times may continue to exist.

In addition, the versatility of a cellular network itself may create additional obstacles. Many other devices have started to utilize the cellular networks (e.g., smart watches, tablets, cellular connected laptop computers, personal digital assistants, pagers, wearable computers, cellular connected cameras, etc.). Each cellular client may need to send numerous communications to maintain connectivity (e.g., communicate its identity, communicate its authentication credentials, communicate a request, receive a request, etc.). The increased amount of devices and traffic may increase the likelihood of congestion. Using a fallback network such as wireless internet access point may alleviate congestion. But fallback networks may not work in situations where there are numerous clients or in situations where clients are not stationary (e.g., access along interstate roadways).

Increasing the number or density of cellular base stations in a given geographic area, making the cells smaller, may improve access in situations of increased congestion. Unfortunately, increasing the number of towers may not alleviate congestion problems; service providers may not be allotted enough spectrum to provide enough unique frequencies to the increased tower density. Obtaining additional spectrum may prove untenable because government agencies allot the spectrum to service providers—a procedure that may take years. Additionally, increasing the number of towers may be prohibitively costly because cellular service providers may need to license additional spectrum from other providers. Increasing the number of towers may also be costly due to the overhead associated with negotiating easements to erect the towers as well as the man-hours required to install them. Additional towers may also be inefficient because increased cellular usage may coincide not with a permanent increase, but with an event (e.g., outdoor concerts, seasonal camping and recreation, etc.).

A distributed cellular delegation may enable cellular phones to remain connected to a cellular service provider while reducing resource usage such as client battery usage and cellular network congestion. The distributed cellular delegation may comprise a set of cellular clients (e.g., one or more smartphones, one or more cellular-equipped personal computers, etc.) communicating through one or more non-cellular connections. The distributed cellular delegation may provide efficient utilization by distributing cellular responsibility between the cellular clients. The cellular responsibility may be initiated from one or more of the cellular clients. The cellular responsibility may be initiated from a cellular service provider of the one or more clients.

FIG. 1 depicts an example cellular network 100 that may include cellular delegations consistent with embodiments of the present disclosure. The cellular network may comprise a cellular service provider 110; a cellular tower 120 (alternatively, a service-provider antenna or a cellular base station); a plurality of isolated cellular clients 130A, 130B, 130C, and 130D (collectively, 130); a distributed cellular delegation 140; and a plurality of distributed cellular clients 150A, 150B, and 150C (collectively, 150). The cellular service provider 110 may comprise one or more servers 112 communicatively coupled to one or more datasources 114. The cellular service provider 110 may comprise additional facilities (not depicted). The cellular service provider 110 may connect cellular clients to the public switched telephone service and the Internet through a variety of connections (e.g., fiber optic cables, copper cables, satellite links, microwaves, etc.).

The cellular tower 120 may send communications to the cellular clients 130 and 150 through a spectrum of radio frequencies. The cellular tower 120 may receive communications from the cellular clients 130 and 150 through the spectrum. The cellular tower 120 may be communicatively coupled to the cellular service provider 110 through a variety of wired or wireless connections. The radio frequencies may be divided into channels such as content channels and control channels. The control channels may enable the cellular clients 130 and 150 to establish and maintain a connection to the cellular network 100. The control channels may operate based upon one or more existing standards (e.g., broadcast control channels, common control channels, dedicated control channels, etc.). The content channels may enable the cellular clients 130 and 150 to send and receive phones calls and messages.

The cellular clients 130 and 150 may comprise one or more cellular radios, one or more non-cellular radios, a microphone and speaker to enable telephone calls, and a user interface. The cellular radios may wirelessly couple the cellular clients 130 and 150 to the cellular tower 120. The cellular radios may wirelessly couple the clients 130 and 150 to other cellular towers (not depicted). The non-cellular radios may provide access to a non-cellular connection through wireless communications. The non-cellular radios may operate based upon a wireless local area network standard (e.g., Wi-Fi networks using the 802.11 standard, HiperLAN/2, etc.). In some embodiments, the non-cellular radios may operate based upon a personal area network standard (e.g., IrDA infrared communications, the Bluetooth standard, the RFID standard, the NFC standard, etc.). The user interface may enable users to alter the settings of the cellular clients 130 and 150 or to send and receive messages from the cellular network 100.

The isolated cellular clients 130 may each utilize a control channel of the spectrum assigned to the cellular service provider 110. The cellular service provider may have to reduce the amount of content channels to provide an adequate number of control channels to support the isolated cellular clients 130. For every content communication (e.g., phone call, text message, etc.), each isolated cellular client 130 may send and receive multiple messages by way of the control channels. The isolated cellular clients 130 may also continually send and receive messages through the control channels in case of a potential content communication (e.g., a smartphone continually communicates to a cellular tower that it is available for a phone call, a cellular-connected tablet continually communicates to a cellular tower that it is available to receive a notification). Also, each of the isolated cellular clients 130 may expend a large portion of its battery to maintain connectivity to the cellular network 100.

The distributed cellular delegation 140 may alleviate congestion of the cellular network 100 and may reduce battery usage of the distributed cellular clients 150. The distributed cellular delegation 140 may be created by the cellular service provider 110 (e.g., the cellular service provider may determine that the distributed cellular clients 150 are part of a family plan). The distributed cellular delegation 140 may be created by the distributed cellular clients 150 (e.g., a user may utilize the user interface of cellular client 150A to indicate that the user wants to participate in a delegation whenever possible).

In some embodiments, if one or more of the distributed cellular clients 150 are within proximity of each other, the distributed cellular delegation 140 may be activated. The distributed cellular clients 150 may use the non-cellular radios to determine they are within proximity of each other. The proximity may be determined by a direct communication between the distributed cellular clients 150 (e.g., a message from client 150B through Bluetooth to client 150C). The proximity may be determined by an indirect communication between the distributed cellular clients 150 (e.g., a message being broadcast through a non-cellular wireless base-station (not depicted) may inform client 150A that client 150B is at an appropriate range for a delegation).

If the distributed cellular delegation 140 has been activated, one client of the distributed cellular clients 150 may be assigned to perform cellular communication for the other clients of the distributed cellular clients. For example, in the depicted scenario, distributed cellular client 150C has been assigned to perform cellular communication for distributed cellular clients 150A and 150B. The assignment may be determined by distributed cellular client 150C. The assignment may be determined by distributed cellular client 150B. In some embodiments, the assignment may be determined by multiple clients, such as client 150A and 150C. In some embodiments, the assignment may be determined by the cellular service provider 110. The assignment may be communicated between the clients 150 through use of the non-cellular radios. In some embodiments, the assignment may be communication between the clients 150 through use of the cellular radios.

The assignment of performing cellular communication may be based on a variety of factors. The factors may relate to the operation status of the clients 150 (e.g., whether one of the clients is currently active and using the cellular network to make a telephone call or stream a song). The factors may relate to the cellular signal of the clients 150 (e.g., whether one of the clients has a stronger signal to a cellular tower). The factors may relate to the battery status of the clients 150 (e.g., one of the clients may have more battery than other clients, one of the clients may be plugged into a power outlet and actively charging while other clients are unplugged). The assignment may alternate periodically (e.g., client 150C may perform cellular communication for five minutes and then client 150A may perform cellular communication for seven minutes, client 150C may perform cellular communication until a message is sent to client 150B and client 150B has activated its cellular functionality to receive the message, client 150C may perform cellular communication until client 150A instructs clients 150C to stop performing cellular communication, client 150C may perform cellular communication for client 150B until client 150B is no longer communicating with client 150C by use of non-cellular radios, etc.).

Once distributed cellular client 150C has been assigned to perform cellular communication, the other distributed cellular clients 150A and 150B may disable cellular functionality (e.g., clients 150A and 150B may turn off power to their cellular radios, clients 150A and 150B may put their cellular functionalities into a sleep-state, etc.). Client 150C may listen with its cellular radio for cellular communications from the cellular tower 120 intended for client 150C. Client 150C may also listen for cellular communications from the cellular tower 120 intended for the other clients 150A and 150B of the distributed cellular delegation 140.

Client 150C may listen for cellular communication intended for the other clients 150A and 150B by utilizing authentication credentials from the other clients (e.g., credentials that the other clients may use to communicate with the cellular service provider 110). The authentication credentials may include any of the following from the other clients 150A and 150B: a personal identification number, an international mobile subscriber identity, a temporary mobile station identity, a private key, a public key, an international mobile equipment identifier. Client 150C may utilize a combination of authentication credentials from the other clients 150A and 150B. The service provider 110 may create a new authentication credential for the distributed cellular delegation 140 to facilitate communication to the distributed cellular client 150C that is intended for the other distributed cellular clients 150A and 150B. Client 150C may also transmit messages to the cellular tower 120 while preforming cellular communication for the other clients 150A and 150B (e.g., pongs, location updates, heartbeats, etc.).

If client 150C receives from cellular tower 120 a cellular communication intended for clients 150A or 150B, client 150C may notify clients 150A or 150B, respectively, to activate cellular functionality. For example, client 150C may receive a telephone call being broadcast by cellular tower 120 intended for client 150A. Client 150C may communicate with client 150A using the non-cellular radios. Client 150C may send a command to client 150A to activate client 150A's cellular radio. Client 150A may then activate its cellular radio and receive the telephone call. In some embodiments, client 150C may forward the cellular communication intended for clients 150A or 150B directly. This may alleviate clients 150A and 150B from receiving the cellular communication from the cellular tower 120.

In some embodiments, client 150C may receive a communication being broadcast by cellular tower 120 that a future communication will be intended for other clients 150A or 150B of the distributed cellular delegation 140. In a second example, cellular tower 120 may transmit to client 150C a communication that indicates the next message to be transmitted is a text message intended for client 150B. Client 150C may send a command from its non-cellular radio to client 150B to activate cellular functionality. In response to the command from client 150C, client 150B may activate its cellular radio and listen for cellular tower 120 to transmit the text message.

Because distributed cellular client 150C performs cellular communication roles for clients 150A and 150B, the performance of the cellular network 100 may be increased. In some embodiments, clients 150A and 150B may not use any control channels while not actively communicating on the cellular network 100. The unused control channels may allow for increased numbers of cellular clients (not depicted) to connect to the cellular network 100. In some embodiments, the cellular service provider 110 may instruct cellular tower 120 to allocate less frequencies of spectrum for control channels due to the distributed cellular delegation 140. The cellular tower 120 may allocate more frequencies of spectrum as content channels—increasing bandwidth for the clients 130 and 150.

Because distributed cellular client 150C performs cellular communication roles for clients 150A and 150B, battery usage may be reduced. While clients 150A and 150B are a part of the distributed cellular delegation 140, they may disable cellular functionality. In some embodiments, clients 150A and 150B may see increased battery performance because the cellular functionality is not constantly using battery (e.g., the batteries may last longer, recharging of battery may occur more quickly, etc.). In some embodiments, clients 130 may see increased battery performance because of the reduced number of clients 130 and 150 simultaneously trying to communicate with the cellular tower 120.

Figure 2:
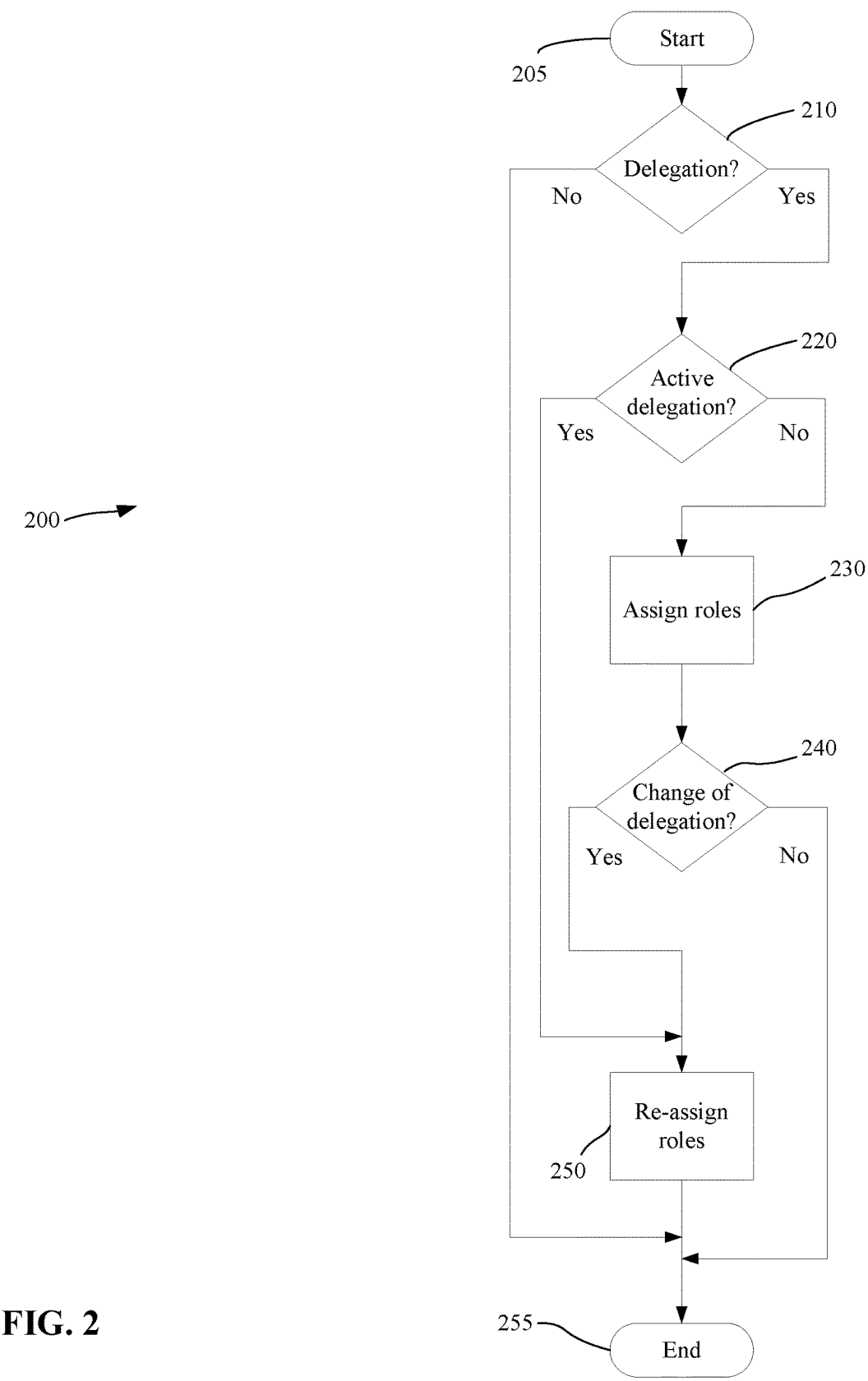
FIG. 2 depicts an example method for distributing cellular responsibilities within a cellular network consistent with embodiments of the present disclosure.

FIG. 2 depicts an example method 200 for distributing cellular responsibilities within a cellular network consistent with embodiments of the present disclosure. The cellular network may include a cellular service provider; a plurality of cellular towers; and cellular clients A, B, C, and D. Method 200 may be executed by one of the cellular clients, such as client B. Method 200 may be executed by the cellular service provider. Method 200 may be executed by a combination of one or more of the cellular clients and the cellular service provider. Certain operations in addition to those depicted by method 200 may be performed by one or more of the plurality of cellular clients. In some embodiments, certain operations of method 200 may be performed repeatedly on a fixed or variable schedule.

From start 205, cellular client A may determine if client A should be part of a distributed cellular delegation (delegation) at 210. Client A may make the determination in response to a command received from the user of client A. Client A may make the determination in response to a signal received from the cellular service provider through one of the plurality of cellular towers. Client A may make the determination in response to a signal received from another cellular client, such as client B. Client A may make the determination in response to a predetermined condition determined by client A (e.g., client A is within range of other clients that have indicated that they want to be a part of the delegation, client A is out of range of any known wireless local area networks, etc.).

If client A determines that it should be part of a delegation, at 210, client A may determine if there is an active delegation in proximity of client A at 220. Client A may determine if there is an active delegation by requesting information from the cellular service provider through one of the plurality of cellular towers. In response to the request from client A the cellular service provider may determine there is an active delegation by sending request to cellular clients in the same cell or a neighboring cell as client A. Client A may determine if there is an active delegation by looking for non-cellular traffic indicative of an existing delegation, such as wireless local area network traffic between cellular clients.

If client A does determine that there is an active delegation, at 210, client A may be assigned a role by one of the other clients at 230. For example, if client C is performing cellular communication roles for clients B and D, client C may inform client A to deactivate client A's cellular radio and listen with its non-cellular radio. If client A does determine that there is an active delegation, at 210, client A may be assigned a role by the cellular service provider at 230. If client A does not determine that there is an active delegation, at 210, client A may be assigned a role by itself at 230. In a second example, client A may assign itself to perform the cellular communication role for the newly created delegation. Client A may then actively broadcast that it is now a part of a delegation. In some embodiments, client A may then actively listen for non-cellular communication indicative of another client desiring to join the delegation created by client A.

If there is a change to the delegation, at 240, the roles may be reassigned at 250. In the first example where client C is performing the cellular communication roles for clients A, B, and D, client C may leave non-cellular radio proximity of the other cellular clients. The roles may be reassigned, at 250, by choosing one of clients A, B, and D to perform the cellular communication roles for the delegation. In the second example where client A is performing the cellular communication roles for client A alone, client B may join the delegation by a request sent to client A by a non-cellular communication. The roles may be reassigned, at 250, by communication to client B that client B's cellular communication role will now be performed by client A. In some embodiments, the roles may be reassigned, at 250, by communication to client B that client B will now perform the cellular communication role for client A.

Method 200 may terminate at 255 in a number of ways. If there is no determination that client A should be a part of a delegation at 210, method 200 may terminate at 255. If there is no change to the delegation at 240, method 200 may terminate, at 255, though client A may continue to listen for commands from other clients. If the roles of the various clients in the delegation are reassigned at 250, method 200 may terminate at 255. For example, client A may no longer be a part of any delegation (e.g., client A is out of non-cellular proximity to any other clients of the delegation, client A may receive an indication from the user that the user no longer wishes to be a part of the delegation, etc.).

Figure 3:
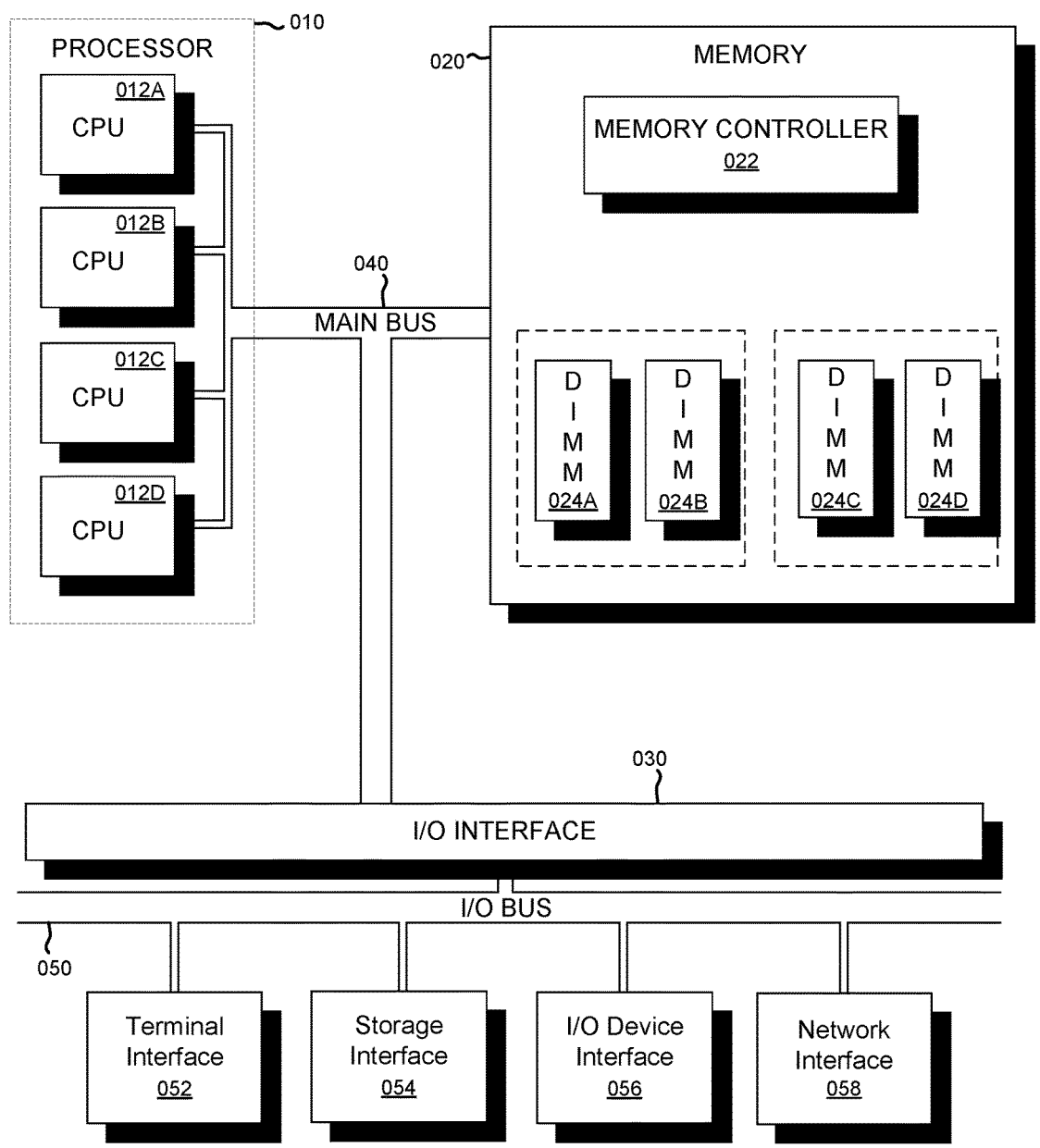
FIG. 3 depicts the representative major components of an exemplary computer system that may be consistent with embodiments of the present disclosure.

FIG. 3 depicts the representative major components of an exemplary computer system 001 that may be used, in accordance with embodiments of the invention. It is appreciated that individual components may have greater complexity than represented in FIG. 3, components other than or in addition to those shown in FIG. 3 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted). The computer system 001 may be in the form of a smart phone or a cellular-connected tablet computer.

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. The CPUs 012 may be comprised of one or more circuits configured to perform one or methods consistent with embodiments of the invention. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001— including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   sending, by a first cellular client, a sharing request to share cellular communication with other cellular clients;
   receiving, by the first cellular client, a response from a second cellular client that the second cellular client will share cellular communication with the first cellular client;
   assigning, by the first cellular client, the first cellular client to perform cellular communication for the second cellular client;
   sending, by the first cellular client, an authentication request to the second cellular client for an authentication credential, the authentication credential configured for use in performing cellular communication for the second cellular client;
   receiving, by the first cellular client, the authentication credential from the second cellular client;
   receiving, by the first cellular client, a transmission from a cellular service-provider antenna intended for the second cellular client; and
   sending, by the first cellular client and based on the transmission, a first command to the second cellular client that instructs the second cellular client to enable the cellular functionality of the second cellular client.

2. The method of claim 1 wherein the assigning is based on a battery status of the first cellular client and the second cellular client.

3. The method of claim 1 wherein the assigning is based on an operation status of the first cellular client and the second cellular client.

4. The method of claim 1 wherein the assigning is based on a cellular signal of the first cellular client and the second cellular client.

5. The method of claim 1 wherein the transmitting is performed by a close-range wireless network.

6. The method of claim 1 further comprising:
   transmitting, by the first cellular client, a status regarding the second cellular client to the cellular service provider.

* * * * *